United States Patent [19]
Ogishima

[11] Patent Number: 5,818,558
[45] Date of Patent: *Oct. 6, 1998

[54] LIQUID CRYSTAL DISPLAY DEVICE

[75] Inventor: Kiyoshi Ogishima, Nara, Japan

[73] Assignee: Sharp Kabushiki Kaisha, Osaka, Japan

[*] Notice: This patent issued on a continued prosecution application filed under 37 CFR 1.53(d), and is subject to the twenty year patent term provisions of 35 U.S.C. 154(a)(2).

[21] Appl. No.: 421,626

[22] Filed: Apr. 13, 1995

[30] Foreign Application Priority Data

May 20, 1994 [JP] Japan ..................... 6-106594

[51] Int. Cl.⁶ ............... G02F 1/1337; G02F 1/1339
[52] U.S. Cl. .............. 349/110; 349/156; 349/162; 349/128; 349/130; 349/132
[58] Field of Search ................ 359/51, 52, 75, 359/77, 78, 81; 349/86, 94, 162, 128, 130, 132, 155, 156, 110

[56] References Cited

U.S. PATENT DOCUMENTS

| | | |
|---|---|---|
| 4,763,995 | 8/1988 | Katagiri et al. ............... 349/129 |
| 5,434,687 | 7/1995 | Kawata et al. ............... 359/78 |
| 5,438,443 | 8/1995 | Taniguchi et al. ............ 359/81 |
| 5,450,220 | 9/1995 | Onishi et al. ................ 359/51 |
| 5,473,450 | 12/1995 | Yamada et al. .............. 359/51 |
| 5,539,545 | 7/1996 | Shimizu et al. .............. 359/81 |
| 5,539,546 | 7/1996 | Koden et al. ................ 349/143 |

FOREIGN PATENT DOCUMENTS

| | | |
|---|---|---|
| 64-88520 | 4/1989 | Japan . |
| 3-37627 | 2/1991 | Japan ..................... 359/73 |
| 5-281526 | 10/1993 | Japan ..................... 349/156 |

*Primary Examiner*—William L. Sikes
*Assistant Examiner*—Tai V. Duong
*Attorney, Agent, or Firm*—David G. Conlin; William J. Daley, Jr.

[57] ABSTRACT

The liquid crystal display device of the invention includes: a first substrate and a second substrate, each substrate having an electrode formed thereon; a liquid crystal layer interposed between the first substrate and the second substrate; and a convex pattern formed on a surface of the second substrate so as to face the liquid crystal layer, the convex pattern having an alignment function for controlling an orientation of liquid crystal molecules in the liquid crystal layer so as to conduct a display in an electrically controlled birefringence mode.

22 Claims, 4 Drawing Sheets

LIQUID CRYSTAL DISPLAY DEVICE

BACKGROUND OF THE INVENTION

1. Field of the Invention:

The present invention relates to a liquid crystal display device (LCD), and more particularly, to a liquid crystal display device with improved viewing-angle characteristics.

2. Description of the Related Art:

Conventionally, an LCD includes a liquid crystal cell including a pair of substrates having electrodes formed thereon and a liquid crystal layer interposed between the pair of substrates. This LCD conducts a display by using the variation of the optical refractive index of the liquid crystal layer according to the orientation change of the liquid crystal molecules caused by an application of a voltage to the liquid crystal layer. Namely, such a conventional LCD utilizes electrooptic effects. As the LCDs utilizing the electrooptic effects of a nematic liquid crystal, an LCD in a twisted-nematic (TN) mode, an LCD in a super twisted-nematic (STN) mode and the like have been put into practical use. Recently, an LCD in an electrically controlled birefringence (ECB) mode utilizing electrically controlled birefringence effects, an LCD in a guest host (GH) mode utilizing dichroic dyes, and the like have partially been put into practical use.

An active-matrix driving LCD, named by the driving system thereof, has also been used. In the liquid crystal cell of this LCD, a plurality of pixel electrodes for applying a voltage to the liquid crystal layer and non-linear elements such as thin-film transistors (TFTs) or diodes functioning as switching elements for selectively driving the respective pixel electrodes are formed on one of the two transparent substrates. The characteristics of these non-linear elements are varied considerably when the elements are irradiated with the light. In other words, the characteristics of the elements are largely degraded by the light irradiation. In order to prevent such degradation, the elements are generally shielded from the light by a black matrix (BM) formed by mixing a metal material such as aluminum and titanium or a black pigment with a photoresist (hereinafter, a BM composed of such a resin-based material will be called a resin BM).

Among the active-matrix driving LCDs mentioned above, the LCDs operating in the TN mode are roughly classified into the following two types of LCDs. One is an LCD in a Normally Black mode which conducts a black display under an OFF state where no voltage is applied to the liquid crystal layer by disposing two polarizers so that the polarization directions thereof are parallel to each other. The other is an LCD in a Normally White mode which conducts a white display under an OFF state where no voltage is applied to the liquid crystal layer by disposing two polarizers so that the polarization directions thereof are perpendicular to each other. Of these two kinds of LCDs, it is preferable to employ an LCD in the Normally White mode in view of display contrast, color reproducibility, and viewing-angle dependence of display quality.

However, in the LCD in the TN mode, the liquid crystal molecules have anisotropy in the refractive indices thereof, and the molecules are pretilted with respect to the substrates. As a result, the display contrast of such an LCD in the TN mode changes easily depending on an angle from which an observer views the LCD. That is, viewing-angle dependence of such an LCD is undesirably large. In the case where the viewing angle is tilted from the normal to the display screen towards a direction in which the display quality is improved (generally to the direction toward the observer), in particular, the black/white (negative/positive) states of the image are inverted at a certain viewing angle. This is called an inversion phenomenon.

In order to decrease the viewing-angle dependence, for example, Japanese Laid-Open Patent Publication No. 64-88520 discloses a method in which a pixel is divided into two or more pretilted angle regions within a single pixel by conducting an alignment treatment with respect to predetermined regions by the use of a photoresist patterning technique.

However, if two or more different pretilted angle regions are formed within a single pixel of the LCD in the TN mode, then the boundaries between these regions remain inside the pixel, thereby generating the disclination lines which leads to considerable degradation of the display quality. In addition, according to the above-mentioned method for conducting an alignment treatment with respect to predetermined regions by the use of a photoresist patterning technique, the number of the necessary production steps is disadvantageously increased, because some kind of alignment treatment such as a rubbing treatment and a photoresist patterning is required to be conducted additionally.

SUMMARY OF THE INVENTION

The liquid crystal display device of the invention includes: a first substrate and a second substrate, each substrate having an electrode formed thereon; a liquid crystal layer interposed between the first substrate and the second substrate; and a convex pattern formed on a surface of the second substrate so as to face the liquid crystal layer, the convex pattern having an alignment function for controlling an orientation of liquid crystal molecules in the liquid crystal layer so as to conduct a display in an electrically controlled birefringence mode.

In one embodiment, the convex pattern is made of a material for aligning the liquid crystal molecules in a direction parallel to a surface of the convex pattern.

In another embodiment, the convex pattern is mixed with a vertically aligning agent for aligning the liquid crystal molecules in a direction vertical to the surface of the convex pattern, or the convex pattern is made of a material combined with the vertically aligning agent.

In still another embodiment, an alignment film for aligning the liquid crystal molecules in a direction parallel to the surface of the second substrate is formed over the electrode on the second substrate.

In still another embodiment, an alignment film for aligning the liquid crystal molecules in a direction vertical to the surface of the second substrate is formed over the electrode on the second substrate.

In still another embodiment, an alignment film for aligning the liquid crystal molecules in a direction parallel to the surface of the first substrate is formed over the electrode on the first substrate.

In still another embodiment, an alignment film for aligning the liquid crystal molecules in a direction vertical to the surface of the first substrate is formed over the electrode on the first substrate.

In an LCD according to the present invention, the convex pattern may have light-shielding characteristics. The convex pattern may be made of a material including at least one resin selected from the group consisting of: an acryl resin, a polyimide resin, a novolak resin, polyvinylalcohol, a cinnamic ester resin, and an acrylic ester resin. Alternatively, the convex pattern may be made of a photosensitive resin. A pair of polarizers may be disposed so that the liquid crystal panel is interposed therebetween and that the polarization axes thereof are perpendicular to each other. Alternatively, a pair of polarizers may be disposed so that the liquid crystal panel is interposed therebetween; and that the polarization axes thereof are parallel to each other, and a birefringence compensator (phase plate) may be disposed between one of the pair of polarizers and the liquid crystal panel so that the compensation axis of the birefringence compensator is vertical to the polarization axis of the polarizer. If necessary, a chiral agent may be mixed with the liquid crystal layer.

Figure 1A:
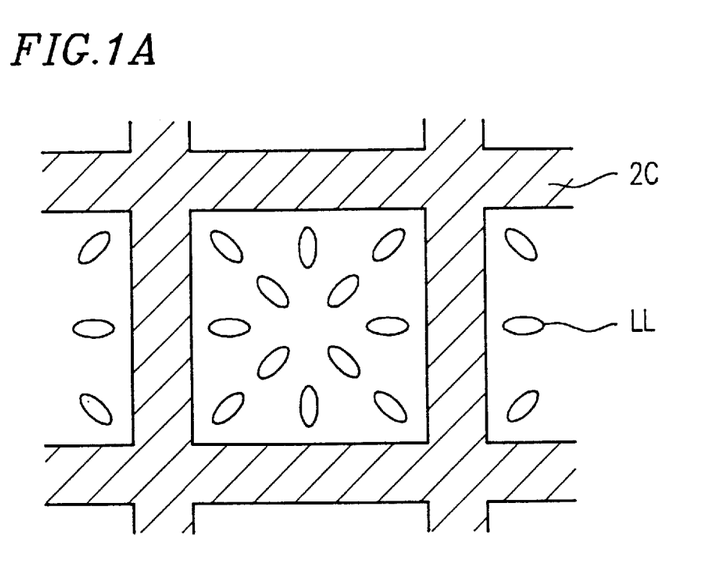
FIGS. 1A and 1B are views illustrating a principle of a liquid crystal display device according to the present invention.
Figure 1B:
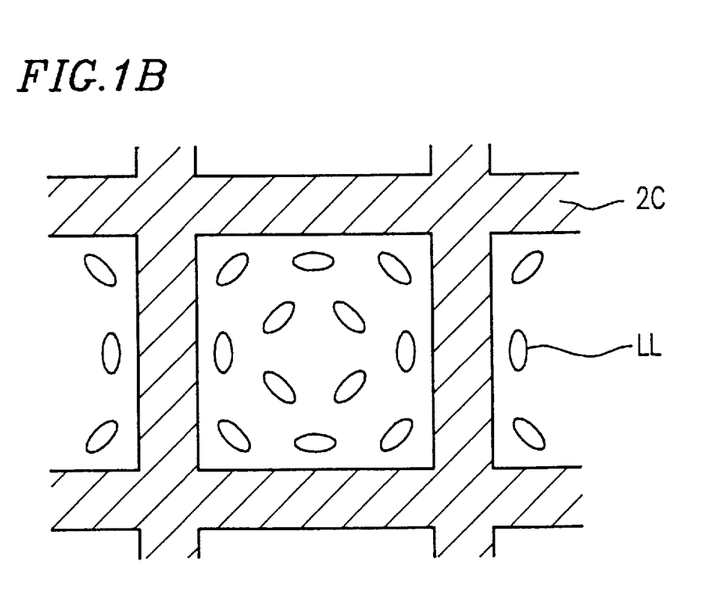

In the liquid crystal display device conducting a display in the ECB mode, a convex pattern having alignment function is formed on the surface of the second substrate facing the liquid crystal layer. In this case, if the convex pattern is made of a material for aligning the liquid crystal molecules in a direction parallel to the surface of the convex pattern, then the liquid crystal molecules are aligned in the direction parallel to the surface of the convex pattern as shown in FIG. 1B. On the other hand, if the convex pattern is made of a material with which a vertically aligning agent for aligning the liquid crystal molecules in a direction vertical to the surface of the convex pattern is mixed, or if the convex pattern is made of a material combined with the vertically aligning agent, then the liquid crystal molecules are aligned in a direction vertical to the surface of the convex pattern as shown in FIG. 1A.

As a result, no boundary between the regions having different orientation states exists inside a pixel, so that no disclination line is generated. Moreover, in both cases shown in FIGS. 1A and 1B, the birefringence Δn of the liquid crystal is equal in all the directions. That is to say, the same birefringence may be obtained at any viewing angle, thereby realizing optical characteristics without any viewing-angle dependence. In addition, according to the present invention, it is not necessary to conduct an alignment treatment such as a rubbing treatment, so that the production process may be simplified.

In the case where an alignment film is formed on the electrode on at least one of the first and the second substrates for aligning the liquid crystal molecules in a direction parallel to the substrate, the orientation state of the liquid crystal molecules may be further stabilized.

On the other hand, in the case where an alignment film is formed over the electrode on at least one of the first and the second substrates for aligning the liquid crystal molecules in a direction vertical to the substrate, the orientation state of the liquid crystal molecules becomes a hybrid one, thereby reducing a driving voltage.

If a convex pattern having light-shielding characteristics is formed, then the pattern may function as a light-shielding film (or a black matrix), thereby preventing the degradation of the characteristics of the non-linear elements owing to the light irradiation. Accordingly, it is not necessary to increase the production steps.

The convex pattern may be made of a material including at least one resin selected from the group consisting of: an acryl resin, a polyimide resin, a novolak resin, polyvinylalcohol, a cinnamic ester resin, and an acrylic ester resin. Since the convex pattern made of such a material has a horizontally aligning force (anchoring strength), the pattern may align the liquid crystal molecules in a direction parallel to a side of the pattern. On the other hand, if the convex pattern is made of a material with which a vertically aligning agent is mixed, or if the convex pattern is made of a material combined with a vertically aligning agent, then a convex pattern having a vertically aligning force is formed and the liquid crystal molecules are aligned in a direction vertical to a side of the convex pattern.

When the convex pattern is made of a photosensitive material, the pattern may be formed with high precision by a photolithography technique.

If a liquid crystal panel having the construction described above is disposed between a pair of polarizers, then the optical refractive index of the liquid crystal panel is varied as the variation of the light transmittance thereof. Accordingly, the display may be conducted by utilizing this variation. Depending on the case, the pair of polarizers are disposed so that the polarization axes thereof are parallel to each other, or so that the polarization axes are vertical to each other. In the case where a light source emitting single color light is used, the intensity of the transmitted light may be controlled by the application of a voltage. In the case where a light source emitting white light is used, the display color may be controlled in various hues by the application of a voltage. The color displayed when the pair of polarizers are disposed so that the polarization axes thereof are parallel to each other, and the color displayed when the pair of polarizers are disposed so that the polarization axes are vertical to each other are in the complementary relationship. In the case where a birefringence compensator is disposed between a polarizer on the light input side (hereinafter, simply referred to as a "polarizer") and the liquid crystal panel, or between a polarizer on the light output side (hereinafter, referred to as an "analyzer") and the liquid crystal panel so that the compensation axis of the compensator is vertical to the polarization axis of the polarizer, a monochromatic display with even higher contrast is realized.

In the case where a chiral agent is mixed with the liquid crystal layer, the orientation of the liquid crystal molecules becomes a twisted one. As a result, optical efficiency is increased and the voltage-transmittance characteristics become steep, thereby realizing a display of a high brightness and a high contrast.

Thus, the invention described herein makes possible the advantage of providing a liquid crystal display device which may improve viewing-angle dependence; which may conduct a high-quality and high-contrast display without generating any disclination lines; and which may be produced by performing a simplified production process.

This and other advantages of the present invention will become apparent to those skilled in the art upon reading and understanding the following detailed description with reference to the accompanying figures.

DESCRIPTION OF THE PREFERRED EMBODIMENTS

Hereinafter, the present invention will be described by way of illustrative examples with reference to the accompanying drawings.

EXAMPLE 1

Figure 2:
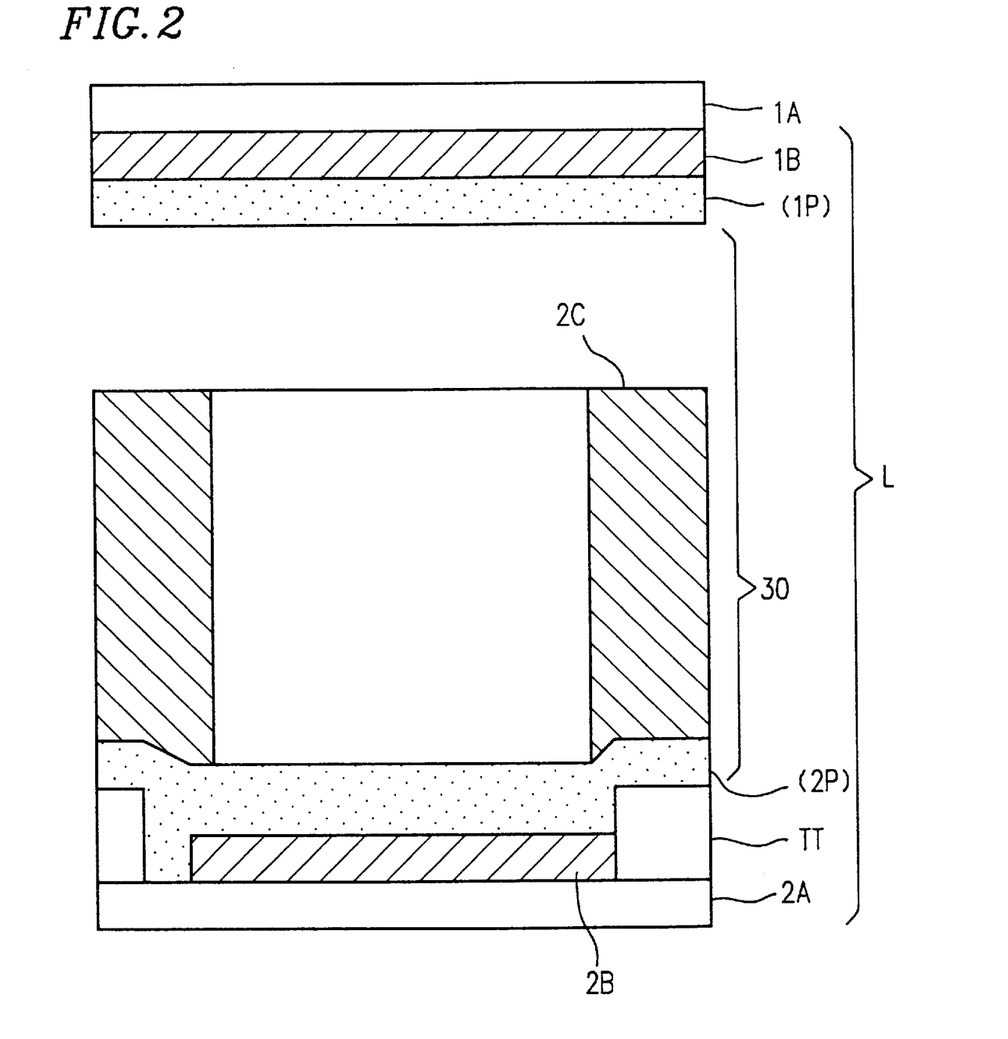
FIG. 2 is a cross-sectional view showing a pixel portion of a liquid crystal panel in a liquid crystal display device according to an example of the present invention.

FIG. 2 is a cross-sectional view showing a pixel portion of a liquid crystal panel L in an LCD according to an example of the present invention. This liquid crystal panel L includes a pair of substrates 1A and 2A being opposed to each other and a liquid crystal layer 30 interposed therebetween. A transparent electrode 1B is formed on the surface of the substrate 1A facing the liquid crystal layer 30, while a transparent electrode 2B and a thin-film transistor TT are formed on the surface of the other substrate 2A facing the liquid crystal layer 30. A convex pattern 2C is also formed on the substrate 2A so as to correspond to the portion excluding the pixel portion. If necessary, alignment films 1P and 2P may be additionally formed on the substrates 1A and 2A, respectively.

This LCD is produced in the following manner.

Figure 3:
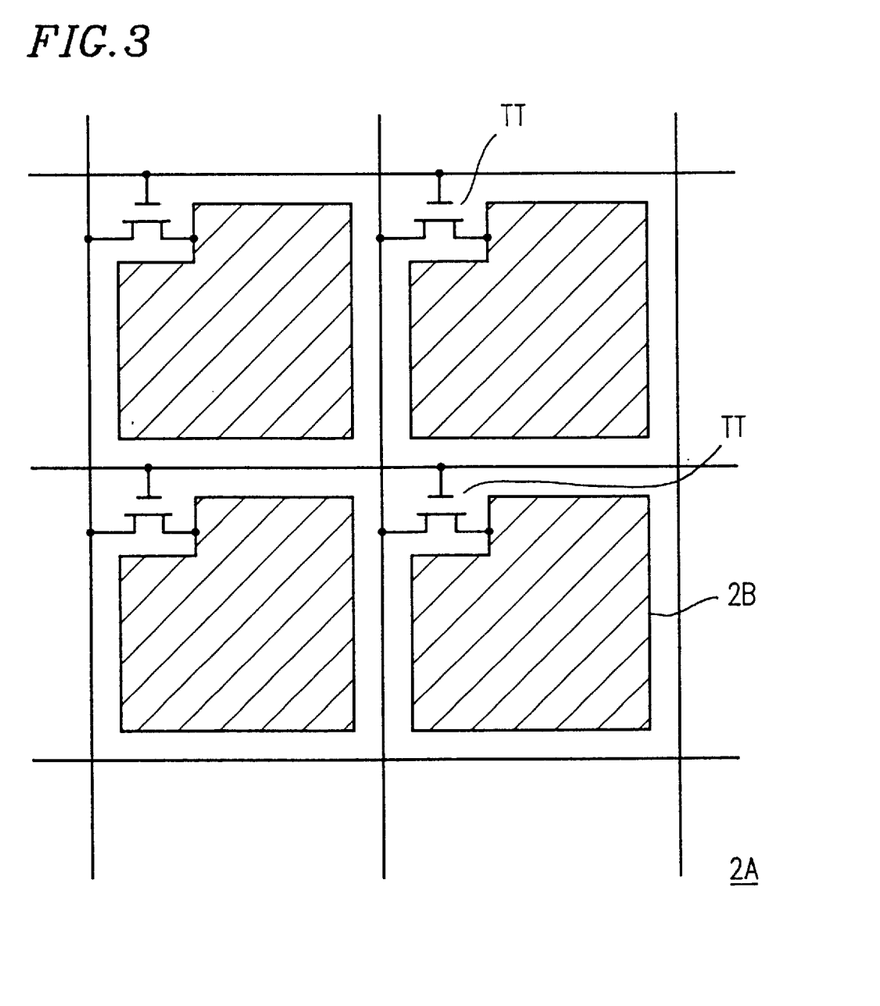
FIG. 3 is a view showing a construction of an active-matrix substrate according to a first example of the present invention.

First, the electrode 1B is formed on the substrate 1A made of barium glass, borosilicate glass, sodium glass, plastic, fused quartz or the like so that the thickness may be 1,000 Å. A thin-film transistor TT and a transparent electrode 2B are formed on the substrate 2A made of a similar material, as shown in FIG. 3.

Next, a convex pattern 2C is formed on the substrate 2A. In this example, the convex pattern 2C is a resin BM. However, the pattern 2C may be made of any material so long as the material has a force for controlling the alignment of the liquid crystal molecules. The resin BM may be made of a material including at least one resin selected from the group consisting of: an acryl resin, a polyimide resin, a novolak resin, polyvinylalcohol, a cinnamic ester resin, and an acrylic ester resin. If such a material is used for the resin BM, the resin BM may have an aligning force for aligning the liquid crystal molecules in a direction parallel to the surface of the resin BM. In the case of using a photosensitive resin as the material of the resin BM, the patterning may be conducted with a high precision. In this example, Color Mosaic CK-2000 (manufactured by Fuji Hunt Electronics Technology) is used as the material for the resin BM. The resin BM may be formed in the following manner.

First, Color Mosaic CK-2000 is applied onto the entire surface of the substrate 2A by a spin-coating method so that the thickness thereof is 3.5 μm. Then, after prebaking the film at 90° C. for 10 minutes in an oven, the film is patterned so that the resin BM 2C covers the thin-film transistor TT and the electrode wirings thereof, and that an opening is provided over the electrode 2B only. Subsequently, the resin is baked at 200° C. for 60 minutes in an oven, thereby forming the resin BM 2C in the portions excluding the pixel portions.

The two substrates 1A and 2A thus formed are disposed so that the respective surfaces having the electrodes formed thereon face each other, and are attached so that the cell thickness (cell gap) is 5 μm. Then the liquid crystal is injected into the gap between the pair of substrates 1A and 2A, thereby forming a liquid crystal layer 30. The liquid crystal molecules are oriented again at 110° C. for 30 minutes in an oven so as to produce a liquid crystal panel L in the ECB mode. There are many kinds of liquid crystal materials which may be used according to the invention. In this example, a liquid crystal material E2 (manufactured by Merck & Co. Inc.) is used.

In the LCD thus produced, the resin BM made of the above-mentioned materials has an alignment controlling force for aligning the liquid crystal molecules in a direction parallel to the surface of the resin BM, so that the alignment of the liquid crystal molecules LL in the liquid crystal layer 30 is controlled by the side of the resin BM 2C. Accordingly, when no voltage is applied to the liquid crystal layer 30, the liquid crystal molecules in the liquid crystal layer 30 are aligned in a direction parallel to the side of the resin BM 2C and to the substrate. On the other hand, in the case where a voltage is applied to the liquid crystal layer 30, the liquid crystal molecules are aligned in a direction vertical to the substrate. Therefore, as shown in FIG. 1B, the liquid crystal molecules LL are tangentially oriented inside the respective pixels, so that wide viewing angle and satisfactory viewing-angle characteristics without any viewing angle dependence in all the directions are obtained. In addition, no boundary between the regions having different orientation states exists inside the pixel, and therefore no disclination line is generated inside the pixel, thereby realizing a display of high quality. Furthermore, since the convex pattern made of the resin BM 2C shields the thin-film transistor from the light, the characteristics of the thin-film transistor TT are neither varied nor degraded by the irradiated light, thereby stabilizing the display characteristics.

In the case where a horizontal alignment film 1P Optomer AL4552 (manufactured by Japan Synthetic Rubber Co., Ltd.) shown in FIG. 2 for aligning the liquid crystal molecules in a direction parallel to the surface of the substrate 1A is printed on the substrate 1A so that the film thickness is 700 Å, the orientation state may be further stabilized. In addition, since an alignment treatment such as a rubbing treatment is not required to be conducted with respect to this alignment film, the number of the necessary production steps may be reduced as compared with that of a conventional LCD.

EXAMPLE 2

In Example 2, an LCD is produced in the same way as in Example 1, except that a horizontal alignment film 2P is formed on the substrate 2A, as shown in FIG. 2. Optomer AL4552 (manufactured by Japan Synthetic Rubber Co., Ltd.) is used as the horizontal alignment film 2P, and printed on the substrate 2A so that the film thickness thereof is 700 Å.

The orientation state of the LCD of Example 2 may be further stabilized as compared with the LCD of Example 1.

EXAMPLE 3

In Example 3, an LCD is produced in the same way as in Example 1, except that a resin BM made of a material mixed with a vertically aligning agent for aligning the liquid crystal molecules in a direction vertical to the surface of the convex pattern 2C is formed as the convex pattern 2C on the substrate 2A. The resin BM 2C is produced in the following manner by using Color Mosaic CK-2000 (manufactured by Fuji Hunt Electronics Technology) used in Example 1 as a material for the resin BM 2C and N-N-dimethyl-n-tetradecylamine as the vertically aligning agent.

First, a material obtained by mixing N-N-dimethyl-n-tetradecylamine (10 wt %) with Color Mosaic CK-2000 is applied onto the entire surface of the substrate 2A by a spin-coating method so that the film thickness is 3.5 μm. Then, the film is prebaked at 90° C. for 10 minutes in an oven and then patterned. The patterning is conducted so that the resin BM 2C covers the thin-film transistor TT and the electrode wirings thereof and that an opening may be provided over the electrode 2B alone (so as to correspond to the pixel portion). Thereafter, the film is baked at 200° C. for 60 minutes in the oven, thereby forming the resin BM 2C in the portions excluding the pixel portions.

In the LCD thus obtained, since the vertically aligning agent is mixed with the resin BM 2C, the resin BM 2C has a vertical alignment controlling force, so that the alignment of the liquid crystal molecules LL in the liquid crystal layer 30 is controlled with respect to the side of the resin BM 2C. Accordingly, when no voltage is applied to the liquid crystal layer 30, the liquid crystal molecules in the liquid crystal layer 30 are aligned in a direction vertical to the side of the resin BM 2C and in a direction parallel to the substrate. On the other hand, in the case where a voltage is applied to the liquid crystal layer 30, the liquid crystal molecules are aligned in a direction vertical to the substrate. Therefore, as shown in FIG. 1A, the liquid crystal molecules LL are radially oriented inside the respective pixels, so that wide viewing angle and satisfactory viewing-angle characteristics without any viewing-angle dependence in all the directions are obtained. In addition, since the convex pattern made of the resin BM 2C shields the thin-film transistor from the light, the characteristics of the thin-film transistor TT are neither varied nor degraded by the irradiated light, thereby stabilizing the display characteristics.

A horizontal alignment film IP (Optomer AL4552; manufactured by Japan Synthetic Rubber Co., Ltd.) shown in FIG. 2 is printed on the substrate 1A so that the film thickness thereof is 700 Å, thereby further stabilizing the orientation state. Since it is not necessary to conduct an alignment treatment such as a rubbing treatment with respect to this alignment film, the number of the necessary production steps may be reduced as compared with that of a conventional LCD.

According to the present invention, the convex pattern has an alignment function such that the orientation of the liquid crystal molecules in the pixel portion of the liquid crystal layer substantially has a rotation symmetry with respect to a center of the pixel. That is, the liquid crystal molecules inside the pixel are radially or tangentially oriented, as shown in FIGS. 1A and 1B, respectively. As a result, a liquid crystal display device having wide viewing angle and satisfactory viewing-angle characteristics without any viewing-angle dependence in all the directions is provided.

EXAMPLE 4

In Example 4, an LCD is produced in the same way as in Example 1, except that a resin BM combined with a vertically aligning agent is formed as the convex pattern 2C on the substrate 2A. The resin BM 2C is produced in the following manner by using Color Mosaic CK-2000 (manufactured by Fuji Hunt Electronics Technology) as a material for the resin BM 2C in the same way as in Example 1 and N-N-dimethyl-n-tetradecylamine as the vertically aligning agent in the same way as in Example 2.

First, Color Mosaic CK-2000 is applied onto the entire surface of the substrate 2A by a spin-coating method so that the film thickness is 3.5 $\mu$m. Then, the film is prebaked at 90° C. for 10 minutes in an oven and then patterned. The patterning is conducted so that the resin BM 2C covers the thin-film transistor TT and the electrode wirings thereof and that an opening is provided over the electrode 2B alone (so as to correspond to the pixel portion). Thereafter, the substrate under this state is immersed in N-N-dimethyl-n-tetradecylamine for 5 minutes so as to combine the resin BM 2C with the vertically aligning agent, and then the film is baked at 200° C. for 60 minutes in the oven.

In the LCD thus obtained, since the vertically aligning agent is combined with the resin BM 2C, the resin BM 2C has a vertical alignment controlling force, so that the alignment of the liquid crystal molecules LL in the liquid crystal layer 30 is controlled with respect to the side of the resin BM 2C. Accordingly, when no voltage is applied to the liquid crystal layer 30, the liquid crystal molecules in the liquid crystal layer 30 are aligned in a direction vertical to the side of the resin BM 2C and in a direction parallel to the substrate. On the other hand, in the case where a voltage is applied to the liquid crystal layer 30, the liquid crystal molecules are aligned in a direction vertical to the substrate. Therefore, as shown in FIG. 1A, the liquid crystal molecules LL are radially oriented inside the respective pixels, so that wide viewing angle and satisfactory viewing-angle characteristics without any viewing-angle dependence in all the directions are obtained. In addition, since the convex pattern made of the resin BM 2C shields the thin-film transistor TT from the light, the characteristics of the thin-film transistor TT are neither varied nor degraded by the irradiated light, thereby stabilizing the display characteristics.

A horizontal alignment film 1P (Optomer AL4552; manufactured by Japan Synthetic Rubber Co., Ltd.) shown in FIG. 2 is printed on the substrate 1A so that the film thickness thereof is 700 Å, thereby further stabilizing the orientation state. Since it is not necessary to conduct an alignment treatment such as a rubbing treatment with respect to this alignment film, the number of the necessary production steps may be reduced as compared with that of a conventional LCD.

EXAMPLE 5

In Example 5, an LCD is produced in the same way as in Examples 3 and 4, except that a horizontal alignment film 2P shown in FIG. 2 is formed on the substrate 2A. Optomer AL4552 (manufactured by Japan Synthetic Rubber Co., Ltd.) is used as the horizontal alignment film 2P and printed on the substrate 2A so that the film thickness thereof is 700 Å.

The orientation state of the liquid crystal molecules in this LCD may be further stabilized as compared with that obtained in Examples 3 and 4.

EXAMPLE 6

In Example 6, an LCD is produced in the same way as in all the previous examples (Examples 1 to 5), except that one of the two horizontal alignment films 1P and 2P is substituted by a vertical alignment film (made of a chrome complex), or a vertical alignment film is additionally formed on one of the two horizontal alignment films 1P and 2P.

In this LCD, the orientation state of the liquid crystal molecules becomes a hybrid one, thereby reducing a driving voltage. Since it is not necessary to conduct an alignment treatment such as a rubbing treatment with respect to this vertical alignment film, the number of the necessary production steps of an LCD may be reduced as compared with that of a conventional LCD.

EXAMPLE 7

Figure 4A:
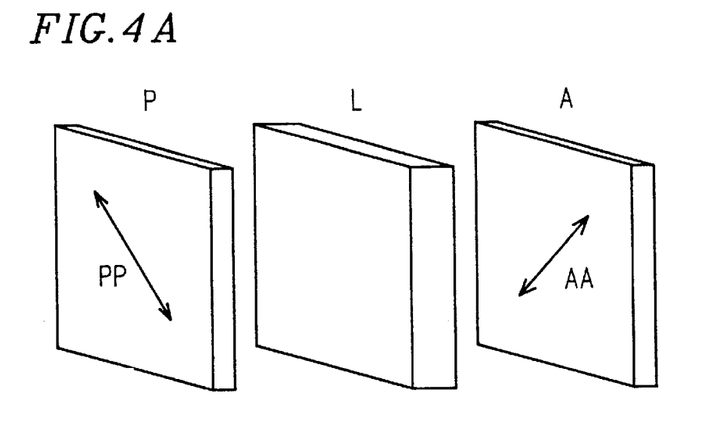
FIGS. 4A and 4B are views showing the constructions of a liquid crystal display device according to a seventh example of the present invention.

In Example 7, a liquid crystal panels L produced in all the previous examples (Examples 1 to 6) is disposed between a polarizer P and an analyzer A.

In this case, if the polarizer P and the analyzer A are disposed so that the polarization axes PP and AA thereof are perpendicular to each other, then it becomes possible to make the best use of the characteristics of the LCD of the invention in the Normally White mode with respect to display contrast, color reproducibility, viewing-angle dependence of the display, etc.

Figure 4B:
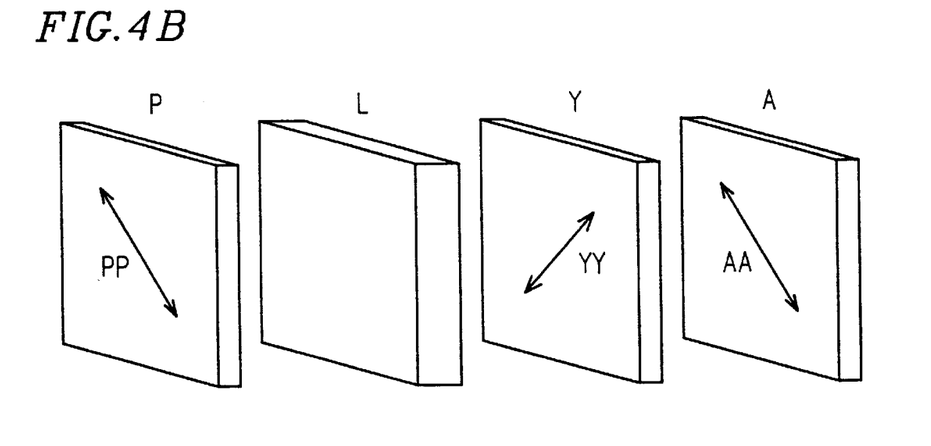

Alternatively, the polarizer P and the analyzer A may be disposed so that the polarization axes PP and AA thereof are parallel to each other, as shown in FIG. 4B. In such a case, if a birefringence compensator Y made of polycarbonate is disposed between the liquid crystal panel L and the analyzer A so that the compensation axis YY of the compensator Y is perpendicular to the polarization axis AA of the analyzer A, then a monochromatic (black/white) display of high contrast may be obtained, thereby further improving the display quality. Alternatively, the birefringence compensator Y may be disposed between the liquid crystal panel L and the polarizer P.

EXAMPLE 8

In Example 8, an LCD is produced in the same way as in Examples 1 to 6, except that the liquid crystal mixed with a chiral agent is injected into the gap between the pair of substrates. There are very many kinds of chiral agents and the selection range is wide. In this example, a chiral agent S-811 (manufactured by Merck & Co., Inc.) is employed and mixed with the liquid crystal material by 0.5 wt %. As a result, the orientation of the liquid crystal molecules becomes a twisted one, so that the optical efficiency of the light may be large and the voltage-transmittance characteristics may be steep. On the other hand, if the LCD of this example is operated under the construction described in Example 7, then a display of high brightness and high contrast is realized.

In the above described examples, the convex pattern is formed so as to surround a pixel portion of the liquid crystal layer 30 in the entire periphery thereof. However, the present invention is not limited thereto, but the convex pattern may be formed so as to surround a pixel portion of the liquid crystal layer 30 in a part or a plurality of parts of the periphery thereof.

According to the present invention, the size of the region to be surrounded by the convex pattern need not correspond to one pixel, but may correspond to two or more pixels. However, it is necessary that no boundary exists inside one pixel.

The materials to be used for an LCD of the invention are not limited to those described in the above examples, but the LCD of the invention may be made of various kinds of materials. The present invention may be applied to various kinds of LCDs such as a simple-matrix driving LCD, an active-matrix driving LCD provided with an MIM (metal-insulator-metal) or a thin-film transistor made of amorphous silicon, polysilicon, single crystalline silicon, etc. In addition, the present invention may be applied to a reflective display device by providing a reflector outside the liquid crystal cell, or by replacing one of the electrodes by a reflector. Moreover, if a color filter is used in combination with an LCD of the invention, then the LCD of the invention may be utilized also as a color display device.

As described above, according to the present invention, a high-brightness and high-quality liquid crystal display device for realizing a high-quality display in which no disclination lines are generated and no viewing-angle dependence exists in all the directions may be obtained. Moreover, according to the invention, the display characteristics may be stabilized, because the characteristics of a thin-film transistor are neither varied nor degraded by the light irradiation. In addition, since the invention requires no alignment treatment such as a rubbing treatment, the number of the necessary production steps may be reduced, and therefore an LCD of high quality may be provided at a lower cost.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:
1. A liquid crystal display device comprising:
   a first substrate and a second substrate, each substrate having an electrode formed thereon;
   a liquid crystal layer interposed between the first substrate and the second substrate;
   and a convex pattern formed on a surface of the second substrate so as to face the liquid crystal layer, the convex pattern having a light-shielding characteristic and including a material that has a property of promoting a predetermined orientation of liquid crystal molecules in the liquid crystal layer with respect to predetermined surfaces of the convex pattern so as to conduct a display in an electrically controlled birefringence mode, wherein the convex pattern surrounds but does not extend into a pixel region of the liquid crystal layer.

2. A liquid crystal display device according to claim 1, wherein the material for promoting a predetermined orientation of liquid crystal molecules aligns the liquid crystal molecules in a direction parallel to the surface of the convex pattern.

3. A liquid crystal display device according to claim 1, wherein in the convex pattern, the material for promoting a predetermined orientation of liquid crystal molecules is mixed with a vertically aligning agent for aligning the liquid crystal molecules in a direction vertical to the surface of the convex pattern, or the convex pattern is made of a material combined with the vertically aligning agent.

4. A liquid crystal display device according to claim 1, wherein an alignment film for aligning the liquid crystal molecules in a direction parallel to the surface of the second substrate is formed over the electrode on the second substrate.

5. A liquid crystal display device according to claim 1, wherein an alignment film for aligning the liquid crystal molecules in a direction vertical to the surface of the second substrate is formed over the electrode on the second substrate.

6. A liquid crystal display device according to claim 4, wherein an alignment film for aligning the liquid crystal molecules in a direction parallel to the surface of the first substrate is formed over the electrode on the first substrate.

7. A liquid crystal display device according to claim 1, wherein an alignment film for aligning the liquid crystal molecules in a direction vertical to the surface of the first substrate is formed over the electrode on the first substrate.

8. A liquid crystal display device according to claim 1, wherein the convex pattern formed on the face of the second substrate does not contact with the first substrate.

9. A liquid crystal display device according to claim 1, wherein the convex pattern surrounds the pixel region of the liquid crystal layer such that the liquid crystal molecules in the pixel region have the predetermined orientation.

10. A liquid crystal display device comprising:
    a first substrate and a second substrate;
    a first and a second electrode respectively formed on the first and the second substrate so as to form a pixel with a liquid crystal layer interposed therebetween;
    and a convex pattern, having a light-shielding characteristic, formed on a surface of at least one of the first and the second substrates such that a portion of the convex pattern surrounds a pixel portion corresponding to the pixel but does not extend into the pixel portion, wherein the portion of the convex pattern includes a material having a characteristic property for promoting an orientation of liquid crystal molecules in the pixel portion of the liquid crystal layer and wherein the orientation of the liquid crystal molecules substantially has a rotation symmetry with respect to a center of a pixel.

11. A liquid crystal display device according to claim 10, wherein the convex pattern is made of photosensitive resin.

12. A liquid crystal display device made by providing a first substrate and a second substrate, each substrate having an electrode formed thereon;

forming a convex pattern between the first substrate and the second substrate whereby a gap is formed between the first substrate and the second substrate, and introducing a liquid crystal layer into the gap, wherein the convex pattern includes a material that has a property of promoting a predetermined orientation of liquid crystal molecules in the liquid crystal layer with respect to predetermined surfaces of the convex pattern, wherein the convex pattern has a light-shielding characteristic, and wherein the convex pattern surrounds but does not extend into a pixel region of the liquid crystal layer.

13. A liquid crystal display device according to claim 12, wherein the convex pattern is made from at least one of a polyimide resin, a novolak resin and a cinnamic ester resin.

14. A liquid crystal display device according to claim 12, wherein the material for promoting a predetermined orientation of liquid crystal molecules aligns the liquid crystal molecules in a direction parallel to the surface of the convex pattern.

15. A liquid crystal display device according to claim 12, wherein in the convex pattern, the material for promoting a predetermined orientation of liquid crystal molecules is mixed with a vertically aligning agent for aligning the liquid crystal molecules in a direction vertical to the surface of the convex pattern, or the convex pattern is made of a material combined with the vertically aligning agent.

16. A liquid crystal display device according to claim 12, wherein an alignment film for aligning the liquid crystal molecules in a direction parallel to the surface of the second substrate is formed over the electrode on the second substrate.

17. A liquid crystal display device according to claim 12, wherein an alignment film for aligning the liquid crystal molecules in a direction vertical to the surface of the second substrate is formed over the electrode on the second substrate.

18. A liquid crystal display device according to claim 17, wherein an alignment film for aligning the liquid crystal molecules in a direction parallel to the surface of the first substrate is formed over the electrode on the first substrate.

19. A liquid crystal display device according to claim 12, wherein an alignment film for aligning the liquid crystal molecules in a direction vertical to the surface of the first substrate is formed over the electode on the first substrate.

20. A liquid display device according to claim 12, wherein the convex pattern is made of photosensitive resin.

21. A liquid crystal display device according to claim 12, wherein the convex pattern formed on the face of the second substrate does not contact with the first substrate.

22. A liquid crystal display device according to claim 12, wherein the convex pattern surrounds the pixel region of the liquid crystal layer such that the liquid crystal molecules in the pixel region have the predetermined orientation.

* * * * *